US005177432A

United States Patent [19]
Waterhouse et al.

[11] Patent Number: 5,177,432
[45] Date of Patent: Jan. 5, 1993

[54] WIRELESS VELOCITY DETECTOR FOR A BICYCLE HAVING A ROTATING AC MAGNETIC FIELD AND RECEIVER COILS

[75] Inventors: Paul I. Waterhouse, Copetown, Canada; Jeffrey C. Brower; Stuart P. Williams, both of Overland Park, Kans.

[73] Assignee: PPG Industries, Inc., Pittsburgh, Pa.

[21] Appl. No.: 708,602

[22] Filed: May 31, 1991

[51] Int. Cl.$^5$ .......................... G01P 3/48; G01P 3/54; B62J 3/00; B62J 6/00
[52] U.S. Cl. .................................... 324/166; 340/432
[58] Field of Search ................ 324/166, 167; 340/432, 340/670, 671

[56] References Cited

U.S. PATENT DOCUMENTS

| | | | |
|---|---|---|---|
| 3,846,701 | 11/1974 | Sampey | 324/175 |
| 4,071,892 | 1/1978 | Genzling | 364/424 |
| 4,074,196 | 2/1978 | Webster | 324/166 |
| 4,152,645 | 5/1979 | Bendler | 324/163 |
| 4,159,644 | 7/1979 | Svala | 73/187 |
| 4,180,859 | 12/1979 | Breant et al. | 364/565 |
| 4,254,489 | 3/1981 | Azzam | 368/84 |
| 4,334,190 | 6/1982 | Sochaczevski | 324/171 |
| 4,398,419 | 8/1983 | Iwasaki | 73/518 |
| 4,434,801 | 3/1984 | Jiminez et al. | 128/689 |
| 4,443,008 | 4/1984 | Shimano | 272/73 |
| 4,633,216 | 12/1986 | Tsuyama | 340/134 |
| 4,636,769 | 1/1987 | Tsuyama | 340/134 |
| 4,638,448 | 1/1987 | Cuvelier et al. | 364/565 |
| 4,642,606 | 2/1987 | Tsuyama | 340/134 |
| 4,642,787 | 2/1987 | McCarthy et al. | 364/561 |
| 4,680,721 | 7/1987 | Pluddemann | 364/565 |
| 4,701,867 | 10/1987 | Bruggemann | 364/550 |
| 4,780,864 | 10/1988 | Houlihan | 368/10 |
| 4,799,178 | 1/1989 | Spadaform et al. | 364/565 |
| 4,817,939 | 4/1989 | Augspurger et al. | 272/73 |
| 4,862,395 | 8/1989 | Fey et al. | 364/561 |
| 4,868,498 | 9/1989 | Lusinchi et al. | 324/173 |
| 4,881,187 | 11/1989 | Read | 364/565 |
| 5,008,647 | 4/1991 | Brunt et al. | 340/432 |

OTHER PUBLICATIONS

Popular Science, Apr., 1991, p. 16.
Performance Bicycle Shop, Spring 1991.
Bike Nashbar, Early Spring '91.

Primary Examiner—Walter E. Snow
Attorney, Agent, or Firm—Andrew C. Siminerio

[57] ABSTRACT

A wireless velocity detector for a bicycle includes a coil mounted on the wheel hub of the bicycle which generates a rotating magnetic field as the wheel rotates, a receiver mounted on the handlebars that includes a pair of coils that sense variations in the strength of the rotating field as the bicycle moves and generates signals in response to the field variations and a microprocessor which converts the signals into information related to the movement of the bicycle, e.g. speed and distance. A liquid crystal display is used to display the information to the cyclist.

26 Claims, 5 Drawing Sheets

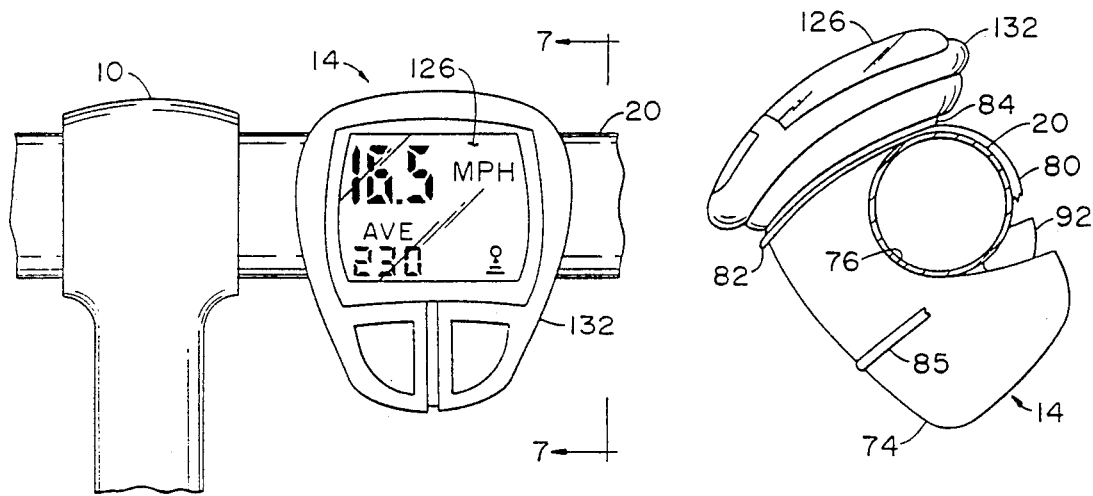
FIG. 6
FIG. 7
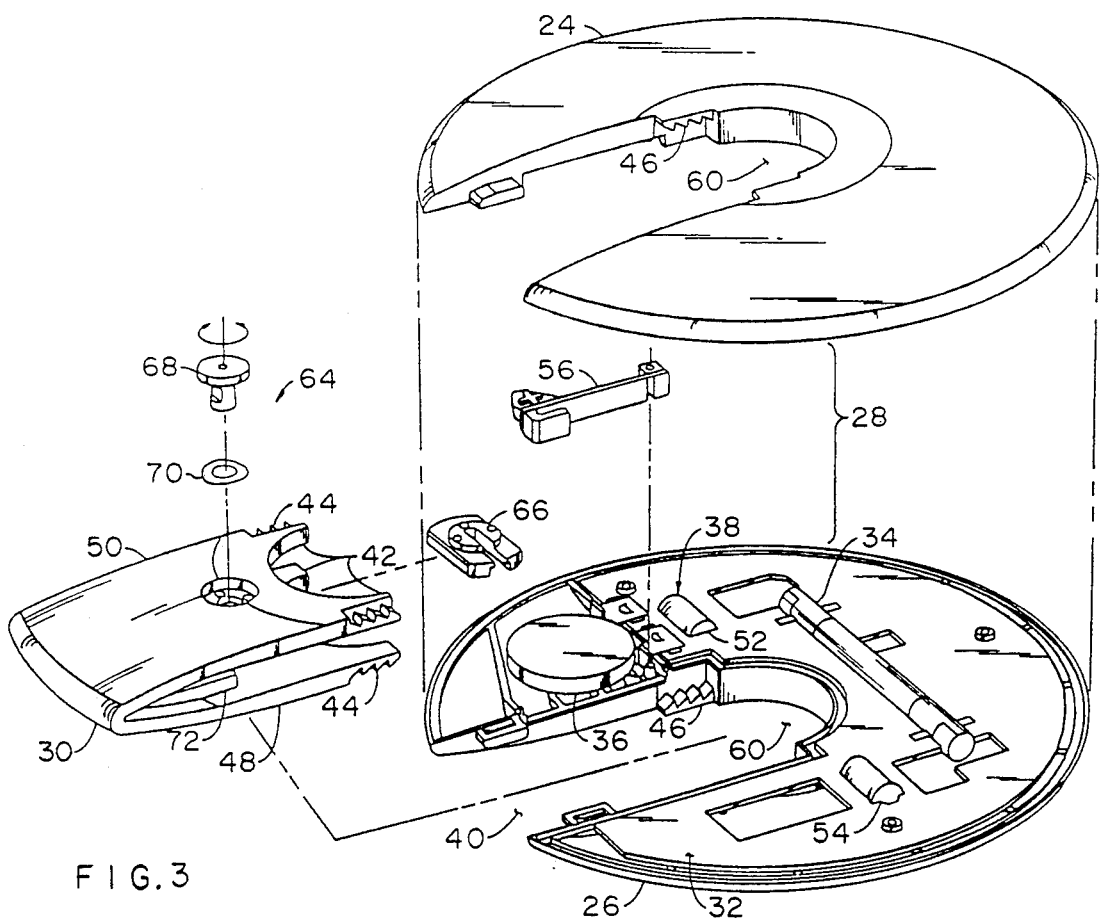
FIG. 3

WIRELESS VELOCITY DETECTOR FOR A BICYCLE HAVING A ROTATING AC MAGNETIC FIELD AND RECEIVER COILS

BACKGROUND OF THE INVENTION

1. Field of the Invention

This invention relates to a device for displaying the velocity and other related information of a moving vehicle, and more particularly a wireless velocity detector for use on a bicycle.

2. Technical Considerations

Cycling is a recreational and competitive sport enjoyed throughout the world. Often times, cyclists mount accessories such as horns, lights, mirrors or reflectors on various portions of the bicycles, such as the handlebar and/or frame. Another commonly installed accessory is a speedometer which generally includes a display unit mounted on the handlebar of the bicycle and a rotation detector generally mounted on the bicycle frame to detect rotation of the bicycle wheel and/or pedal crank. The data display is generally wired directly to the detector to receive a signal from the detector and convert it into various forms of information, such as the bicycle velocity, maximum velocity and distance traveled. This information can be displayed for view by the cyclist on a needle-type gauge or liquid crystal display (LCD). Some units incorporate microprocessors to generate additional information for the cyclist, such as elapsed time and average velocity. In addition, the information can be displayed on the LCD either in sequence or the rider may manually select the type of information to be displayed.

Because the detector and display are normally interconnected by a wire, the connecting wire must be directed along and attached to portions of the bicycle frame. It would be advantageous to be able to send the signal from the detector directly to the data display without the need of an interconnecting wire.

SUMMARY OF THE INVENTION

The present invention provides a wireless detector for monitoring selected information related to a rotating shaft of any structure. In one particular embodiment of the invention, the detector is a wireless velocity detector and the structure is a moving vehicle, and more particularly a bicycle. A transmitter is mounted on the hub of a wheel of the bicycle and includes a coil that generates a magnetic field when energized. The coil rotates in the plane of rotation of the wheel at a rate directly proportional to the rate of rotation of the wheel. A pair of coils are positioned in a receiver mounted on the bicycle at a location removed from the wheel, preferably on the handlebar. The receiver coils are oriented such that they can sense any variation in the strength of the magnetic field as the field rotates. The receiver coils generate continuous, sinusoidal signals in response to the variations in the field strength and these signals are converted into information related to the movement of the bicycle, e.g. velocity and distance traveled. This information is selectively displayed on a liquid crystal display easily viewed by the cyclist.

In a preferred embodiment of the invention, the receiver coils are oriented 90° relative to each other. These signals are amplified, multiplied together and filtered. The resulting signal is proportional to twice the angular frequency of the wheel mounted transmitter. The signal is then converted to a square wave output which is then sent to a microprocessor which takes the signal and using previously inputted data that is stored in the microprocessor, e.g. bicycle tire circumference, transforms it into elapsed time, speed, and distance.

BRIEF DESCRIPTION OF THE DRAWINGS

FIG. 3 is an exploded isometric view of the transmitter shown in FIG. 2.

FIG. 6 is an elevational view of the receiver mounted on the handlebar of a bicycle.

FIG. 7 is a cross sectional view taken along line 7—7 of FIG. 6.

DETAILED DESCRIPTION OF THE INVENTION

The present invention includes a method and apparatus for monitoring selected information related to a rotating shaft of a structure and is presented in combination with the hub of a bicycle wheel in monitoring selected operating parameters of the bicycle such as velocity and distance traveled. However, it should be understood that the present invention can be used to determine the velocity of other types of the vehicles based on the rotation of a rotating member as well as monitor other rotational parameters of the shaft, such as rotational velocity and RPMs.

Figure 1:
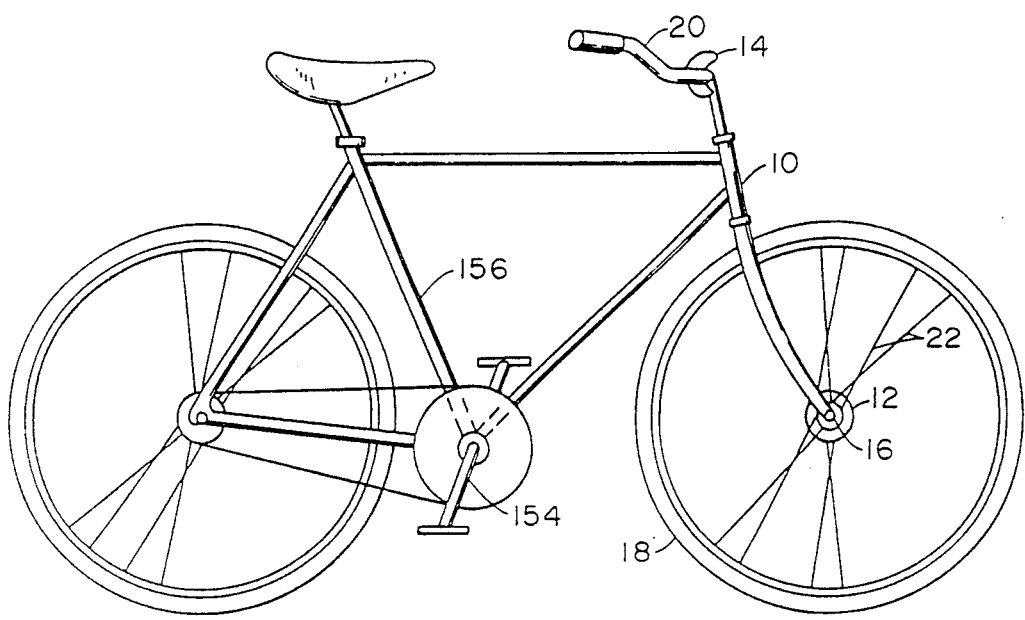
FIG. 1 is an elevational view of a bicycle incorporating features of the present invention.

FIG. 1 illustrates a bicycle 10 having a transmitter 12 and a receiver 14 incorporating features of the present invention. The transmitter 12 is mounted at the hub 16 of front wheel 18 of the bicycle 10 and the receiver 14 is mounted on the bicycle handlebars 20.

Figure 2:
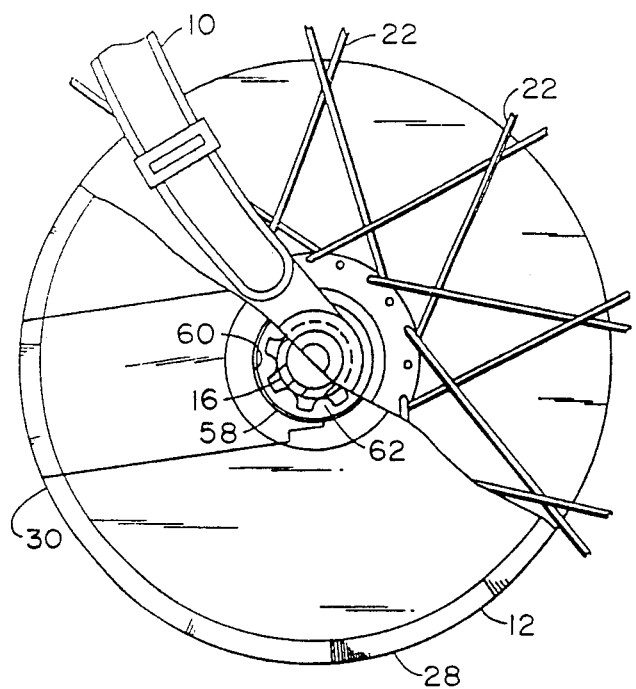
FIG. 2 is an enlarged plan view of the front bicycle wheel illustrated in FIG. 1, showing the transmitter of the present invention secured about the hub of the front wheel, with portions removed for clarity.

Referring to FIG. 2, the transmitter 12 is positioned between the spokes 22 of the bicycle wheel 18 and is secured to the wheel hub 16. In this manner, the transmitter 12 is positioned along the rotational centerline of the wheel 18 as well as in its vertical plane of rotation so that the transmitter 12 has little or no effect on wheel balance. In addition, since the transmitter 12 is positioned between the spokes 22, it is protected from damage due to an object hitting the transmitter 12.

Figure 4:
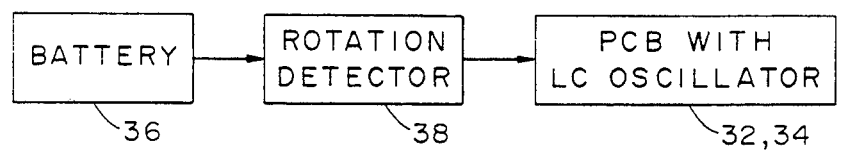
FIG. 4 is a block diagram of the components of the transmitter illustrated in FIG. 3.

Referring to FIG. 3, the transmitter 12 includes first and second disk members 24 and 26 which form the main body 28 of the transmitter 12 and a removable door member 30. Although not limiting in the present invention, in the particular embodiment shown in FIG. 3, the main body 28 houses a printed circuit board (PCB) assembly 32 which functions as an LC oscillator, as is well known in the art, with a coil 34 operating as the signal radiating element, a power source 36 and a wheel rotation detector 38 (as shown schematically in FIG. 4) which energizes the coil 34 when the wheel 18 rotates, as will be discussed later in more detail. The longitudinal axis of the coil 34 is skewed relative to the axis of rotation of the wheel 18, i.e. the two axes do not intersect. In addition, the axes are at right angle to each other, i.e. if the axes where superimposed over each other they would be perpendicular. In the preferred embodiment of the invention illustrated in FIG. 3, the coil 34 is positioned such that its longitudinal axis is perpendicular to the radius of the wheel 18. When door member 30 is removed, it provides a slot 40 so that the transmitter 12 can slide into place over the wheel hub 16. The ends 42 of the door member 30 include teeth 44 which engage complementing teeth 46 in the main body 28 of the transmitter 12. The door member 30 is made of a resilient material so that when it is installed into the main body 28, its teeth 44 are biased outwardly toward and interlock with complementing teeth 46. To remove the door member 30, opposing wall portions 48 and 50 are biased towards each other so as to disengage the teeth 44 from the teeth 46 in the main body 28.

The transmitter 12 operates by energizing the coil 34 as the wheel 18 rotates. This energized coil 34 generates a magnetic field which rotates about the wheel hub 16 in the plane of the wheel 18 as the coil 34 rotates end over end, once for each revolution of the wheel 18. The speed of the rotating field, which will be in direct proportion to the speed of the rotating wheel 18, is detected by the receiver 14 as will be discussed later. It should be appreciated that although in the preferred embodiment of the invention the transmitter 12 is located between the spokes 22 of the wheel 18 so that the coil 34 rotates in the plane of the wheel 18, it is contemplated that the transmitter 12 can be mounted at a different location, e.g. next to the wheel 18 outside the spokes 22.

PCB assembly 32 operates as an LC oscillator so that the transmitter 12 operates at a defined frequency to which the receiver 14 can be tuned. As a result, superfluous signals from other potential signal sources can be rejected by the receiver 14. In addition, an oscillating signal is preferred because it requires less power than a sustained signal such as that generated by a permanent magnet or electromagnet. The lower power consumption results in longer battery life. Although not limiting in the present invention, the frequency is preferably within the range of 25,000 to 50,000 Hz. In one particular embodiment of the invention, the transmitter 12 operates at a frequency of approximately 35,000 Hz.

The transmitter 12 achieves long battery life by activating the LC oscillator and energizing the coil 34 only when the wheel 18 is turning. More specifically, in the particular embodiment illustrated in FIGS. 3 and 4, the rotation detector 38 includes a pair of mercury switches 52 and 54 positioned 180° relative to each other about the rotational axis of the wheel 18. The mercury switches are electrically interconnected to the coil 32 and power source 36 such that when the transmitter 12 is not rotating, as would be the case when the bicycle 10 is not moving, at least one of the mercury switches is open and no current passes from the power source 36 through the coil 34. As the bicycle 10 begins to move and the wheels rotate, centrifugal force will cause the mercury in each of the switches to move outward, thus closing the circuit and allowing current to pass from the power source 36 through the coil 34. As discussed above, the energized coil 34 generates a rotating magnetic field which is detected by the receiver 14. To accommodate the operating condition when the bicycle 10 is moving at such a slow speed that both switches 52 and 54 are not simultaneously closed, the switches 52 and 54 may be incorporated into a sequential charge pass-on circuit, as is well known in the art. Although not limiting in the present invention, in one particular embodiment, the pass-on circuit includes a pair of capacitors in series with the switches 52 and 54. In operation, as the wheel 18 rotates, a first switch 52 closes and one of the capacitors acquires and holds a charge. As the wheel 18 continues to turn, switch 52 opens and thereafter switch 54 closes. The capacitors will then share the charge acquired by the first capacitor and pass it to the coil 34 which generates the magnetic field when energized. Only when both switches 52 and 54 are closed either simultaneously, as in the case of high speed rotation of the wheel 18, or sequentially closed, as in the case of slow wheel rotation as discussed above, will the coil 34 be energized. Since the capacitors discharge over time, they are sized to maintain their acquired charge for a predetermined period of time corresponding to the minimum desired detectable speed. Although not limiting in the present invention, in one particular embodiment, the charge pass-on circuit will energize the coil 34 at wheel rotational speeds equivalent to a bicycle velocity as low as 1 mile per hour (1.6 km per hour).

A battery door 56 is positioned within the main body 28 of the transmitter 12 to hold the power source 36, preferably a lithium coin-type battery, in place.

Figure 5:
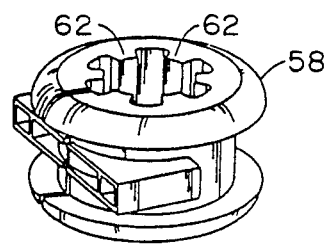
FIG. 5 is an isometric view of an elastomeric grommet used to secure the transmitter shown in FIG. 2 about the hub of a bicycle wheel.

In order to hold the transmitter 12 securely on the hub 16 of the bicycle wheel 18, an elastomeric grommet 58 as shown in FIG. 5 is used. The grommet 58 is sized so as to fit within the slot 40 and opening 60 of the assembled transmitter 12. Various sized grommets 58 may be used to accommodate a range of wheel hub sizes. Finger members 62 extend inwardly from the grommet 58 to grip the wheel hub 16. In practice, to install the transmitter 12, the grommet 58 is first positioned around the hub 16. The grommet wall is split so that the grommet 58 could be spread to receive the wheel hub 16. The main body 28 is then slid over the grommet 58 through the slot 40 to position the grommet 58 at the opening 60. The door member 30 is then slid into place to lock the transmitter 12 onto the hub 16.

If desired, an additional locking member 64 can be incorporated into the door member 30 to prevent unwanted removal of the transmitter 12. Although not limited in the present invention, in the particular embodiment illustrated in FIG. 3, the locking member 64 includes a lock wing 66, positioned between the wall portions 48 and 50 of the door member 30, secured to a lock shaft 68 and spring washer 70. The width of the lock wing 66 is such that in a first position, the lock wing 66 will fit between extending rib portions 72 (only one shown in FIG. 3) within the door member 30 so that the wall portions 48 and 50 of the door member 30 can be biased towards each other to disengage its teeth 44 from mating teeth 46 of the main body 28. When the lock wing 66 is turned 90° by the lock shaft 68, it is positioned such that its body is transverse to the internal ribs 72. In this orientation, the wall portions 48 and 50 cannot be biased toward each other so that the door member 30 cannot be removed from the main body 28 of the transmitter 12.

Figure 8:
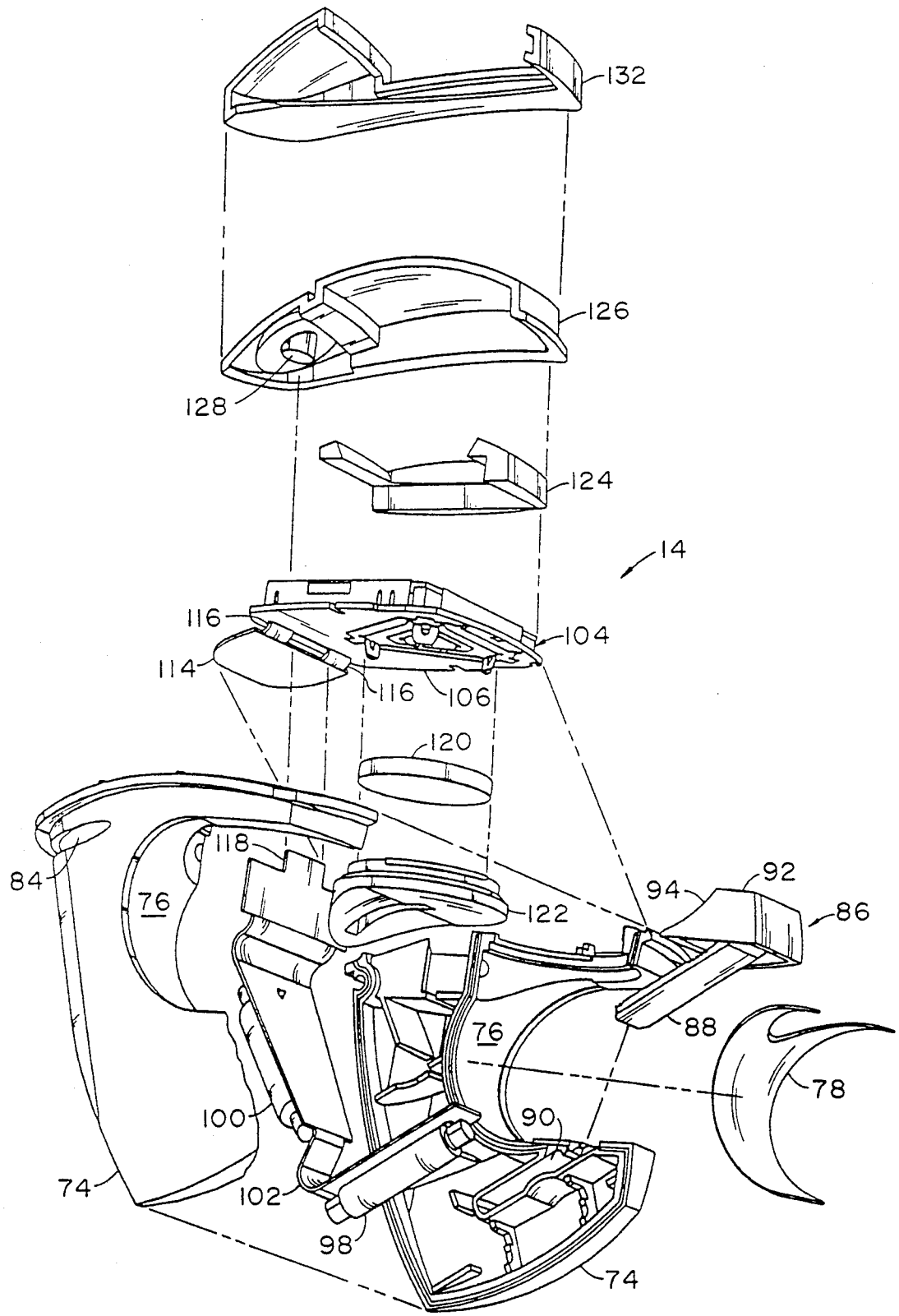
FIG. 8 is an exploded cross sectional view of the receiver shown in FIG. 6, with portions removed for clarity.

Referring to FIGS. 6 through 8, the receiver 14 is shown positioned on the handlebar 20 of the bicycle 10 and includes a casing 74 which houses the receiver components. With particular attention to FIG. 8, one surface 76 of the receiver 14 has a curvilinear configuration which generally conforms to the curvature of the handlebar 20. Shim members 78 may be positioned along this surface 76 to better fit the receiver 14 with the handlebar 20. An elastic band member 80 (shown only in FIG. 7) is used to secure the receiver 14 to the handlebar 20. The band 80 includes an upper loop 82 which fits within groove 84 and extends around the upper portion of the casing 74 and a lower loop 85 which extends over the handlebar 20 and around the lower portion of the casing 74, capturing the handlebar 20 between the band 80 and the casing 74. If desired, a locking arrangement may be used to provide a more permanent mounting of the receiver 14 to the handlebar 20. Although not limiting in the present invention, a lock member 86 includes a toothed slide 88, which is received within an opening 90 in the lower portion of the casing 74, and a head portion 92 which includes a curved surface 94 which generally corresponds to the curvature of the handlebar 20. By inserting the slide 88 into the opening 90 as far as it can go so that the head portion 92 contacts the handlebar 20, the teeth of the slide 88 engage corresponding teeth in the opening 90 and the receiver 14 is held in place on the handlebar 20. To remove locking member 86, an elongated member (not shown) is inserted through an opening (not shown) in casing 74 to bias slide 88 away from the teeth in opening 90 allowing locking member 86 to slide out of the casing 74.

Figure 9:
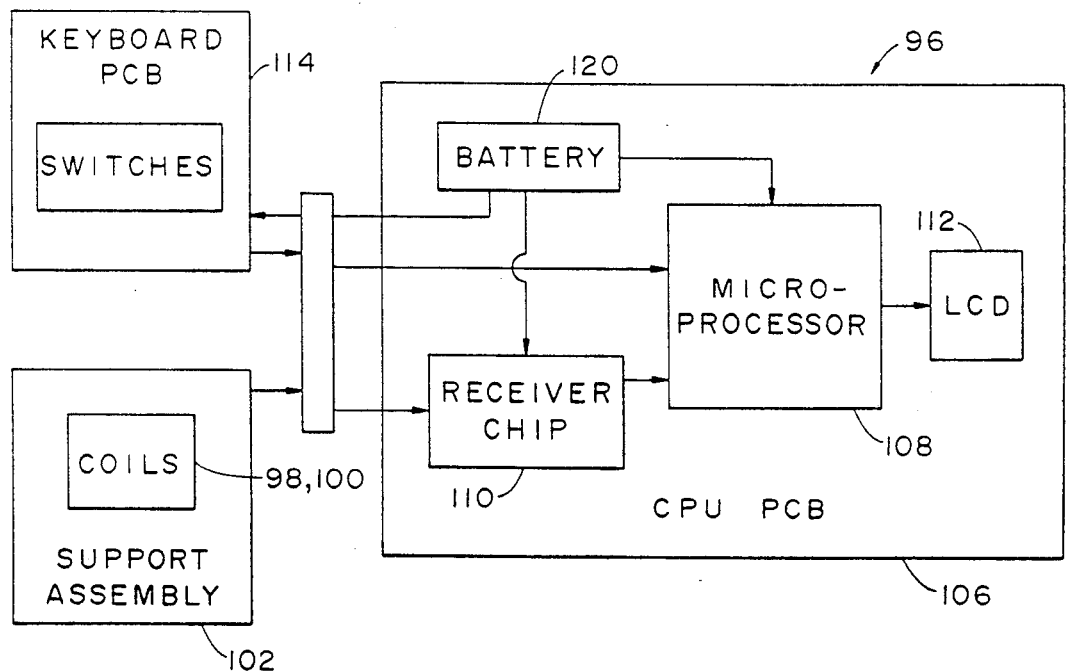
FIG. 9 is a block diagram showing the components of the receiver illustrated in FIG. 8.

Referring to FIG. 9, the receiver 14 includes a receiver circuit 96 that takes the real time rotational data generated by the transmitter 12 and converts it to a digital signal for a microprocessor which, in turn, performs all computation functions and conversions and drives an internally mounted liquid crystal display (LCD). More specifically, although not limiting in the present invention, referring to FIG. 8, the receiver circuit 96 of receiver 14 includes a pair of receiver coils 98 and 100 mounted on a flexible printed circuit board support assembly 102 and positioned within the casing 74 as shown in FIG. 8. In the preferred embodiment of the invention illustrated in FIG. 7, the coils 98 and 100 are oriented 90° relative to each other to sense the rotating magnetic field of the transmitter coil 34 in a manner to be discussed below in more detail. In addition, the coils 98 and 100 are preferably oriented at approximately 45° to horizontal for reasons to be discussed later.

The receiver 14 also includes a unit 104 having a CPU printed circuit board assembly 106 with a microprocessor 108, a receiver chip 110 (which is part of the receiver circuit 96 as will be discussed later), a liquid crystal display (LCD) 112 driven by the microprocessor 108, and a keyboard printed circuit board 114 to modify the viewed display on the LCD 112. Keyboard PCB 114 makes electrical contact with unit 104 through tabs 116. Although not limiting in the present invention, the LCD 112 is a two parameter display that is driven by a one half bias, duplex drive circuit as is well known in the art, the microprocessor 108 of assembly 106 is a semi-custom, 4-bit, mask program microprocessor such as a Sanyo LC5863 low power CMOS microprocessor and the receiver chip 110 of assembly 106 is a fully custom, low power CMOS integrated circuit. The PCB assembly 106 of unit 104 and support assembly 102 are electrically interconnected through tab 118. A power source 120, such as a lithium coin cell, powers the receiver 14 and is held in place by a removable battery door 122. A bezel 124 frames the LCD 112 and a lens case 126 covers the bezel 124 and unit 104. The lens case 126 includes an integrally molded flexible actuator. Although not limiting in the present invention, in the particular embodiment illustrated in FIG. 8, the case 126 includes two molded flexible actuators 128 (only one shown) each with a post that extends downwardly from the case 126 and contacts one of two corresponding metal dome switches (shown schematically in FIG. 9) on the keyboard PCB 114. Actuators 128 control the display functions of the receiver 14, as will be discussed later in more detail. A cover member 132 is fitted over the lens case 126 to enclose the upper portion of the receiver 14 and the actuators 128.

Figure 10:
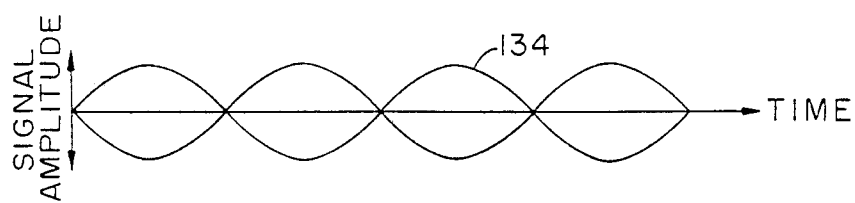
FIG. 10 is a representation of the signal wave envelope monitored in one embodiment of the invention.
Figure 11:
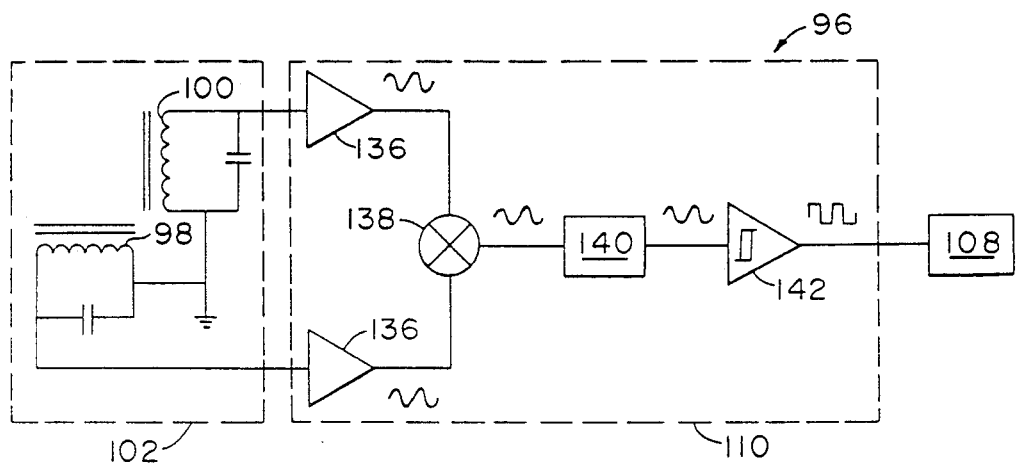
FIG. 11 is an electrical schematic of a receiver circuit for processing the signal wave envelope shown in FIG. 10.
Figure 13:
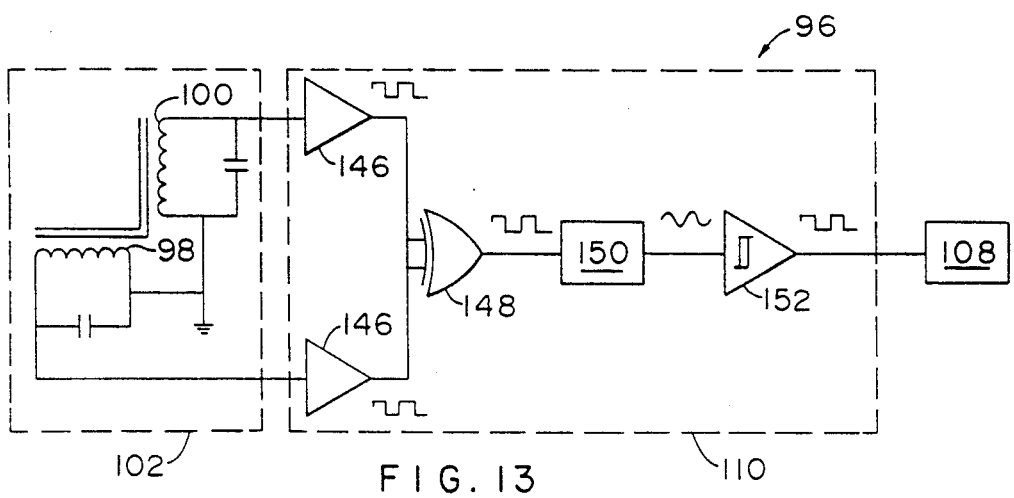
FIG. 13 is an electrical schematic of a receiver circuit for processing the signal wave envelope shown in FIG. 12.

Although not limiting in the present invention, the disks 24 and 26 of the main body 28, door member 30 and casing 74 are preferably an injection molded plastic material, In operation, when the wheel 18 rotates, the transmitter coil 34 is energized and generates a rotating magnetic field which is detected by the receiver 14. More particularly, coils 98 and 100 of the receiver circuit 96 each generate a continuously changing signal in response to the changing magnetic field that passes through the coils. Although not limiting in the present invention, in the preferred embodiment, in order to "tune" the receiver 14, i.e. make the coils 98 and 100 more selective to a particular frequency, a capacitor is selected to amplify a received signal corresponding to the frequency to the transmitter 12 as shown in FIGS. 11 and 13. Due to the relative orthogonal orientation of the coils 98 and 100, the first receiver coil 98 will have a maximum magnetic field impressed on it from coil 34 while the second receiver coil 100 does not have any field impressed on it and as the wheel 18 continues to turn and the magnetic field from the transmitter coil 34 rotates, the second coil 100 will have a maximum field impressed on it while the first coil 98 does not sense any field. The envelope 134 of the signal generated by each receiver coil 98 and 100 is a sinusoidal signal as shown in FIG. 10. Due to the orthogonal mounting arrangement of coils 98 and 100, their respective signal envelopes are 90° out of phase relative to each other. Referring to FIG. 11, in one particular embodiment of the invention, these signals pass through a linear amplifier 136 of the receiver circuit 96, which includes the coils 98 and 100 on the support assembly 102 and the receiver chip 110 and associated circuitry on PCB assembly 106, and are multiplied together by an analog multiplier 138. The resulting signal passes through a low pass filter 140. Filtration yields a signal with an amplitude proportional to twice the angular frequency of the wheel mounted transmitter 12. The filtered waveform is then converted to a digital waveform, i.e. a square wave output, by an amplifier with hysteresis 142, such as a Schmitt trigger. This digital output is then sent to the microprocessor 108.

Figure 12:
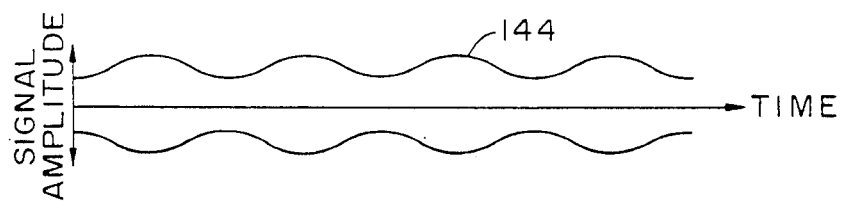
FIG. 12 is a representation of the signal wave envelope monitored in a different embodiment of the invention.

It was found that when the receiver coils 98 and 100 are in close proximity to each other, as in the preferred embodiment of the invention, they become magnetically coupled, i.e. when one coil, for example coil 98 generates a primary signal as a result of the magnetic field impressed on it by the rotating magnetic field of the transmitter 12, it produces a secondary magnetic field which is impressed on the other coil 100. As a result, a secondary signal is generated by coil 100. Similarly, the primary signal generated by coil 100 resulting from the transmitter field produces a secondary magnetic field which is impressed on the coil 98 and, in turn, produces a secondary signal from coil 98. As a result, the output signal of a receiver coil at any given time is the sum of the primary signal resulting from the rotating magnetic field passing through the coil and the secondary signal resulting from the magnetic field generated by the other receiver coil. The resulting signal envelope 144 is shown in FIG. 12. As can be seen, the variation in envelope amplitude, i.e. modulation of the signal, is reduced and the envelope 144 no longer has periods of 0 amplitude. This envelope configuration allows the use of limiting amplifiers and a digital multiplier in the receiving circuit 96 rather than linear amplifiers and an analog multiplier as discussed above. More particularly, referring to FIG. 13, each signal is amplified by a limiting amplifier 146 which converts the signal to a square wave output. These waveforms are multiplied together by a digital multiplier 148, which in the preferred embodiment of the invention is an Exclusive OR gate. The resulting signal is filtered by a multi-staged switched capacitor filter 150 which produces a low frequency sinusoidal waveform with an amplitude proportioned to twice the angular frequency of the wheel mounted transmitter 12. This sinusoidal waveform then passes through an amplifier with hysteresis 152 to produce a square wave output which is sent to the microprocessor 108.

The microprocessor 108 receives the raw data and using previously inputted data that is stored in the microprocessor, e.g. bicycle tire circumference, transforms it into data related to the movement of the bicycle by executing internally stored programs as is well known in the art. Although not limiting in the present invention, in the preferred embodiment the data generated by the programs is based on the number of state changes, i.e. transitions, in the square wave output per unit of time. The cyclist uses the actuators 128 to select which of the available functions is displayed on the LCD 112. In one particular embodiment of the invention, the current velocity is always displayed on the LCD 112 regardless of any secondary function selected by the cyclist (shown as 16.5 MPH on FIG. 6). Although not limiting in the present invention, the secondary functions may include, but are not limited to, average velocity, maximum velocity, current distance, total (cumulative) distance, elapsed time and real time.

Although not limiting in the present invention, in the preferred embodiment, the microprocessor 108 may operate in a different computational mode to accommodate specific speed/wheel size combinations. More particularly, with low speed/large wheel combinations, velocity measurements are made by measuring the time between transitions in the square wave output rather than the number of transitions in a given period. This will allow for greater accuracy at low speeds.

The receiver chip 110 of the receiver circuit 96 also produces a carrier detect output signal which is transmitted to the microprocessor 202 to indicate to the microprocessor that the receiver 14 is receiving a reliably detectable signal from the transmitter 12. When the bicycle 10 is not moving or is moving at such a slow speed that the sequential charge pass-on circuit of rotation detector 38 does not energize the coil 34, the receiver circuit 96 will no longer detect a magnetic field and it will stop generating the carrier detect signal. When the carrier detect signal is not received by the microprocessor 108 for a predetermined time interval after the last detected signal is received, the microprocessor 108, in turn, will power down assemblies 102 and 110 as well as place itself in a low power mode. The microprocessor 108 will continue to momentarily power the receiver circuit 96 and test for a carrier detect signal present on a regular basis. If the carrier detect signal is detected, the microprocessor 108 will power up the assemblies 102 and 110 and they will remain powered as long as receiver circuit 96 continues to detect a signal from the transmitter 12. The assemblies 102 and 110 are also re-powered immediately upon pressing either of the activators 128. This power shut down feature serves two important features. First, it prolongs battery life by operating the assemblies 102 and 110 only when there is a detectable signal from the transmitter 12, i.e. when the bicycle 10 is moving. Second, an elapsed time counter and average speed calculations (possible secondary functions) may be suspended when the current velocity equals zero, i.e. when the bicycle wheel 18 is not rotating for longer than a predetermined time interval. This will allow accurate training data to be acquired even when the cyclist is forced to stop for traffic lights or scheduled rest periods.

The wireless connection between the transmitter 12 and the receiver 14 is designed so that it will not interfere with other bicycle computers of the same or different type located outside a one half meter radius of the transmitter. More particularly, magnetic field strength is inversely proportional to the cube of the distance between the transmitter 12 and the receiver 14. In the preferred embodiment of the invention, the output from the receiver circuit 96 to the microprocessor 108 is a square wave that has been processed to remove undesired interfering signals and "lock onto" the stronger signal generated by the rotatin transmitter 12.

As stated earlier, in the preferred embodiment of the invention, the receiver 14 includes two orthogonal coils that are oriented at 45° to the horizontal. However, other receiver configurations may be used. For example, a single coil may be used to receive the signal from the rotating magnetic field; however, this is not preferred because a single coil can generate only a signal. With two coils, there is better accuracy because the receiver is receiving twice as many signals. In addition, with a single coil the velocity, distance and other bicycle information to be calculated by the microprocessor 108 will be based on the amplitude variation of the single signal which, in turn, is based on the variations in the magnetic field strength. Because this type of arrangement depends on signal strength, and more particularly the absolute amplitude of the signal, the minimum required signal strength is higher. With the preferred two coil configuration, the absolute amplitude of each signal is irrelevant since it is the multiplied and filtered signal that are being used by the microprocessor 108 to generate the relevant bicycle information. Using the multiplied and filtered signal, the receiver can extract the angular velocity of the transmitter (and the wheel)

with the output signal being twice the angular frequency of the transmitter.

In addition, the coils 98 and 100 do not have to be at 90° relative to each other; however the 90° orientation provides the maximum values when the signals are multiplied together as discussed earlier.

In the preferred embodiment of the invention, coils 98 and 100 are oriented relative to the horizontal such that the longitudinal axis of the transmitter coil 34, when aligned with the receiver 12, bisects the angle between the receiver coils 98 and 100. As a result, the maximum signal strength impressed on each receiver coil as the transmitter coil 34 rotates about hub 16 is the same and variations in the amplitude of the signal envelope are minimized, producing highest sensitivity and best interference rejection. As can be seen, when the transmitter coil 34 is positioned directly below the receiver 14, an orientation of coil 98 and 100 of approximately 45° relative to the horizontal provides optimal sensitivity in detecting the magnetic field generated by coil 34. It is obvious that as the transmitter 12 and receiver 14 move further apart with respect to their vertical alignment, this optimal angle will change; however it is believed that the 45° orientation, on the average, provides a reliable arrangement for acceptable performance of the receiver 14.

Based on the above, it would be obvious to one skilled in the art that more than two coils may be used and the coils may be positioned at various orientations to receive the transmitter signal and convert it into useful information for the cyclist.

It should be appreciated that the present invention can be combined with pulse signal generators, as are well known in the art, to monitor other functions simultaneously with the bicycle velocity, e.g. crank rotation. Referring to FIG. 1, a signal generator (not shown) can be positioned on the crank 154 and bicycle frame 156, for example as disclosed in U.S. Pat. Nos. 4,636,769 to Tsuyama and 4,780,864 to Houlihan, to generate an AM burst signal each time the crank 154 passes a set position on the frame 156. This signal will be detected by the receiver coils 98 and 100 and characterized by the receiver circuit 96 as a "spike" which can be separated from the transmitter signal. This type of arrangement may also be used to detect heart rate from a wireless transmitter which is attached to the cyclist and transmits an AM burst signal in response to the cyclist's heart beat.

The forms of this invention shown and described in this disclosure represent illustrative preferred embodiments and various modifications thereof. It is understood that various changes may be made without departing from the scope of the invention as defined by the claimed subject matter which follows.

We claim:

1. A system for measuring and displaying information related to the movement of a bicycle comprising:
   transmitter means secured to a wheel of said bicycle having a coil oriented generally along a longitudinal axis generally parallel to a plane of rotation of said wheel and a power source to generate a continuous rotating AC magnetic field which rotates at a rate proportional to the rotation of said wheel;
   receiver means positioned on said bicycle, removed and electrically isolated from said transmitter means including at least two coils at a predetermined angle relative to each other such that said continuous rotating AC magnetic field passes through each of said coils, wherein each of said coils generates a continuous signal which strength is proportional to the strength of said magnetic field sensed by said coil;
   means to convert said signals into selected data related to said movement of said bicycle; and
   means to display selected portions of said data.

2. The system as in claim 1 wherein said generating means includes an LC oscillator with said coil generating said magnetic field.

3. The system as in claim 1 further including means to automatically energize said transmitter coil when said wheel is rotating.

4. The system as in claim 1 wherein said receiver means further includes means to allow selection of said data to be displayed on said display means in alphanumeric form.

5. The system as in claim 1 wherein said receiver coils each lie in planes generally parallel to said plane of rotation of said wheel.

6. The system as in claim 5 wherein said receiver coils lie in a common plane.

7. The system as in claim 6 wherein said receiver coils are oriented approximately 90° relative to each other.

8. The system as in claim 7 wherein said receiver coils are oriented approximately 45° relative to horizontal.

9. The system as in claim 5 wherein said receiving means further includes a microprocessor to receive said signals from said receiving coils and perform computations and conversions required to generate said selected data.

10. The system as in claim 9 wherein said selected data includes the velocity and distance traveled by said bicycle.

11. The system as in claim 9 wherein said generating means includes a coil oriented along a longitudinal axis generally parallel to a plane of rotation of said wheel.

12. The system as in claim 11 wherein said signal converting means includes means to receive a first continuous signal from said first receiver coil in response to variations in said magnetic field sensed by said first receiver coil, means to receive a second continuous signal from a second coil in response to variations in said magnetic field sensed by said second receiver coil, means to multiply said continuous signals together and filter a resulting signal such that said resulting signal has an amplitude equal to twice the angular velocity of said rotating wheel.

13. The system as in claim 12 further including means to convert said resulting signal to square wave signal.

14. The system as in claim 1 further including means to temporarily deactivate said receiving means when said transmitter does not generate said magnetic field and automatically reactivate said receiving means when said transmitter begins to generate said magnetic field.

15. A system for measuring and displaying information related to the rotation of the shaft, comprising:
   transmitter means secured to a rotating shaft, including means to generate a continuous AC magnetic field which rotates with said shaft;
   receiver means positioned at a location removed and electrically isolated from said transmitter means, including at least two coils oriented at a predetermined angle relative to each other such that said continuous rotating AC magnetic field passes through each of said coils, wherein each of said coils generates a continuous signal which strength is proportional to the strength of said magnetic field sensed by said coil;

means to convert said signals into selected data related to said shaft rotation; and means to display selected portions of said data.

16. A method of measuring information related to the movement of a bicycle, comprising:

energizing a magnetic field generator to generate a continuous AC magnetic field in response to rotation of a wheel of said bicycle;

rotating said continuous AC magnetic field in a plane generally parallel to a plane of rotation of said wheel at a rate in proportion to the rotation of said wheel such that the strength of said AC magnetic field varies at a receiver position on said bicycle at a location spaced and electrically insulated from said field generator;

positioning at least two coils oriented at a predetermined angle relative to each other at said receiver in a manner such that said rotating AC magnetic field passes through each of said coils;

generating continuous signals at each of said coils which strength is proportional to the strength of said field passing through said coil in response to said continuous AC magnetic field;

converting said signals into selected data related to the movement of said bicycle; and displaying selected portions of said data.

17. The method as in claim 16 wherein said energizing step further includes automatically energizing said field generator when said wheel is rotating.

18. The method as in claim 16 wherein said providing step further includes orienting said coils such that said coils each lie in planes generally parallel to said plane of rotation of said wheel.

19. The method as in claim 18 wherein said positioning step further includes orienting said coil at 90° relative to each other.

20. The method as in claim 19 wherein said orienting step further includes orienting said coils 45° relative to horizontal.

21. The method as in claim 18 wherein said generator rotating step includes rotating said generator in a plane generally parallel to a plane of rotation of said wheel.

22. The method as in claim 21 wherein said converting step includes converting said signals into the velocity and distance traveled by said bicycle.

23. The method as in claim 21 wherein said converting step includes receiving a first continuous signal from said first receiver coil in response to variations in said magnetic field sensed by a first coil, receiving a second continuous signal from a second coil in response to variations in said magnetic field sensed by said second coil, multiplying said continuous signals together and filtering a resulting signal such that the resulting signal has an amplitude equal to twice the angular velocity of said rotating wheel.

24. The method as in claim 23 further including the step of converting said signal to a square wave signal.

25. The method as in claim 21 further including the steps of temporarily suspending said sensing step when said rotating step is temporarily suspended and automatically terminating said temporary suspension of said sensing step upon re-initiation of said rotating step.

26. A method of measuring information related to the rotation of a shaft, comprising:

generating a continuous AC magnetic field in response to rotation of a shaft;

rotating said continuous AC magnetic field at a rate proportional to the rotation of said shaft;

positioning at least two coils spaced from and electrically insulated from said shaft, said coils being oriented at a predetermined angle relative to each other in manner such that said continuous rotating AC magnetic field passes through each of said coils;

generating continuous signals at each of said coils which strength is proportional to the strength of said field passing through said coil in response to said rotating continuous AC magnetic field;

converting said signals into selected data related to said rotation of said shaft; and displaying selected portions of said data.

* * * * *